(12) United States Patent
Liang et al.

(10) Patent No.: US 11,658,522 B2
(45) Date of Patent: May 23, 2023

(54) ELECTRIC MACHINE HAVING MAGNETICALLY MODIFIED REGION

(71) Applicant: Ford Global Technologies, LLC, Dearborn, MI (US)

(72) Inventors: Feng Liang, Troy, MI (US); Alfredo R. Munoz, Ann Arbor, MI (US); Leyi Zhu, Novi, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1203 days.

(21) Appl. No.: 15/782,888

(22) Filed: Oct. 13, 2017

(65) Prior Publication Data

US 2019/0115794 A1    Apr. 18, 2019

(51) Int. Cl.
| | | |
|---|---|---|
| *H02K 1/14* | (2006.01) | |
| *H02K 1/16* | (2006.01) | |
| *H02K 15/02* | (2006.01) | |
| *H02K 1/02* | (2006.01) | |
| *H02K 1/18* | (2006.01) | |
| *H02K 15/00* | (2006.01) | |

(52) U.S. Cl.
CPC ............. *H02K 1/165* (2013.01); *H02K 1/02* (2013.01); *H02K 1/148* (2013.01); *H02K 1/185* (2013.01); *H02K 15/0018* (2013.01); *H02K 15/024* (2013.01); *H02K 15/026* (2013.01); *H02K 2201/15* (2013.01)

(58) Field of Classification Search
CPC .... H02K 1/165; H02K 1/185; H02K 2201/15; H02K 15/026; H02K 15/0018; H02K 1/02; H02K 3/34; H02K 3/345; H02K 3/38; H02K 3/18; H02K 3/46; H02K 1/04; H02K 1/14; H02K 1/146; H02K 1/16; H02K 1/18

See application file for complete search history.

(56) References Cited

U.S. PATENT DOCUMENTS

| | | | | |
|---|---|---|---|---|
| 6,127,753 | A * | 10/2000 | Yamazaki | H02K 3/522 310/194 |
| 2002/0130630 | A1 * | 9/2002 | Uchida | H02K 41/03 318/114 |
| 2005/0206263 | A1 * | 9/2005 | Cai | H02K 3/12 310/198 |

(Continued)

FOREIGN PATENT DOCUMENTS

| | | |
|---|---|---|
| EP | 3012944 A1 | 4/2016 |
| JP | 163421 * | 3/2015 |

*Primary Examiner* — Bryan R Perez
(74) *Attorney, Agent, or Firm* — David B Kelley; Brooks Kushman P.C.

(57) ABSTRACT

An electric machine includes a stator and a rotor. The stator has a yoke fitted over a ring that has a plurality of teeth with gaps therebetween for fitting metal windings. The ring of teeth has an inner circumference that is closed and to connect the teeth, and an outer circumference with open gaps or slots between the teeth. The metal windings are fitted through the open outer circumference. Regions of the closed inner circumference between the teeth are treated such that the region's magnetic permeability is reduced relative to the remainder of the stator. The reduction in magnetic permeability provides a magnetic flux barrier between the teeth.

9 Claims, 2 Drawing Sheets

(56) References Cited

U.S. PATENT DOCUMENTS

| | | | |
|---|---|---|---|
| 2013/0134827 A1* | 5/2013 | Nagahama | H02K 15/02 |
| | | | 310/216.113 |
| 2016/0099616 A1* | 4/2016 | Hino | H02K 1/16 |
| | | | 310/216.043 |
| 2017/0093237 A1 | 3/2017 | Tsuda et al. | |
| 2017/0108833 A1 | 4/2017 | Yamamoto et al. | |
| 2019/0036391 A1* | 1/2019 | Brohm | H02K 15/022 |

* cited by examiner

ELECTRIC MACHINE HAVING MAGNETICALLY MODIFIED REGION

TECHNICAL FIELD

The present disclosure relates to electric machines, such as electric motors. More specifically, this disclosure relates to stator of an electric machine having regions of modified magnetic properties existing in regions between teeth that separate windings.

BACKGROUND

Electric motors operate through an interaction between the electric motor's electromagnetic fields produced by the rotor and stator to generate a force. Electric motors can also be used in reverse as generators to convert mechanical energy into electric power.

Such electric machines can typically include a rotor that turns with the shaft to deliver or transfer mechanical power, a stator that remains stationary and includes windings, an air gap between the rotor and the stator, and windings or coils typically wrapped around a core so as to form magnetic poles when energized with current.

SUMMARY

According to one embodiment, a stator for an electric motor includes a stator yoke having a first inner surface, and an annular tooth member. The annular tooth member includes a second inner surface, a plurality of teeth extending radially outward therefrom and coupled to the first inner surface, and regions of material between the teeth having a reduced magnetic permeability relative to the teeth. The reduction in magnetic permeability in the regions provides a magnetic flux barrier between the teeth.

In another embodiment, an electric motor includes a rotor and a stator. The stator has a plurality of teeth disposed about a central axis and separating windings disposed between the teeth. The stator has an inner surface radially spaced from the rotor. The inner surface has a plurality of regions of reduced magnetic permeability. Each of these regions is radially aligned with windings between the teeth to inhibit magnetic permeability between the teeth.

In yet another embodiment, a method of manufacturing a stator for an electric motor is provided. The method includes forming a plurality of stator yoke sections, each having a curved inner region and an interlocking feature. The method further includes, reducing the magnetic permeability of a portion of the inner region located between the teeth in the annular tooth member. The method further includes assembling the stator yoke sections together to form an annular stator yoke by interlocking individual stator yoke sections, and assembling a stator yoke circumferentially about the annular stator tooth member to form a complete stator core.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As explained above, electric machines typically include a rotor, a stator, an air gap, and windings, among other components. A common stator core design for radial electric machines includes round laminations including a yoke and a number of teeth. The spaces existing between the teeth are typically referred to as slots and are used to contain the winding coils. In a randomly wound winding, the coils are pre-wound and inserted into the slot through the opening between teeth. Because of the circumferential geometry of the laminations and the desire to reduce the empty space between adjacent teeth at the air gap diameter, the opening available to insert the windings inside the slot is very small. This results in difficulty in achieving high fill factors (e.g., ratio of copper to total slot area) in the slot.

The present disclosure provides various embodiments for improving the slot fill factor, including building the stator lamination with two separate pieces of lamination, namely a first part with the stator yoke and another part with all the teeth. As will be described below, the stator yoke can radially surround an annular tooth member, and the two components are two separate pieces assembled to each other. This allows the coils to be pre-wound and inserted radially from the outer diameter of the stator teeth. After the coils have been inserted into the slots between the teeth, a separate lamination ring is used to create the stator yoke assembly.

Figure 1:
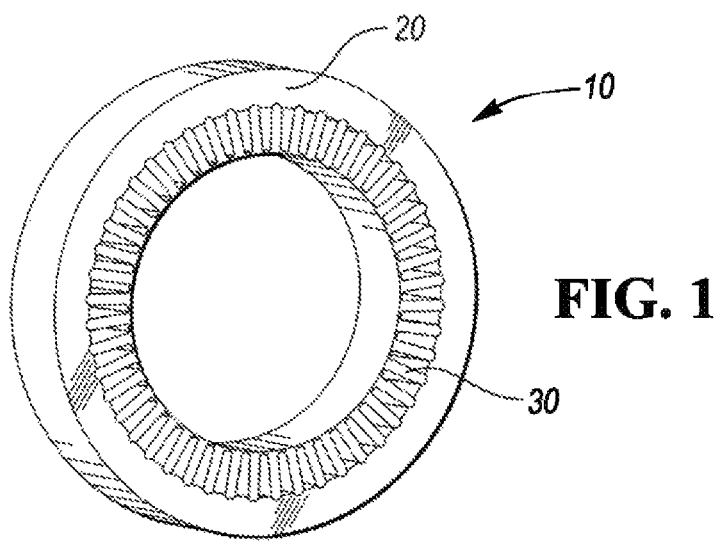
FIG. 1 is a perspective view of a stator according to one embodiment of this disclosure, in which the stator includes a stator yoke about an annular tooth member to form the stator.
Figure 2:
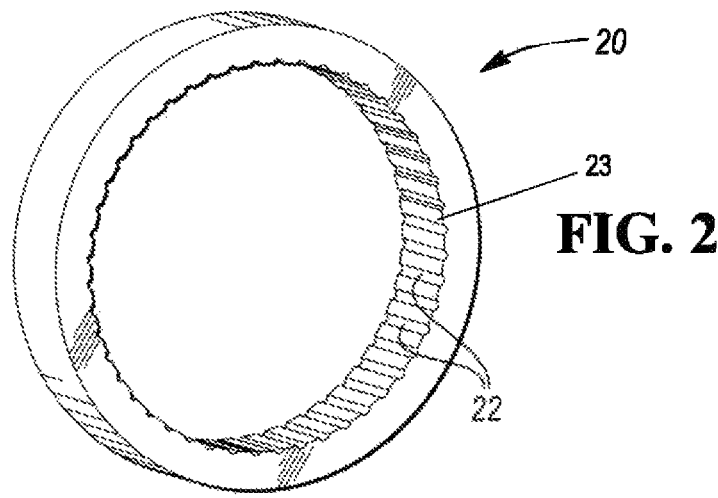
FIG. 2 is a perspective view of the stator yoke of FIG. 1.
Figure 3:
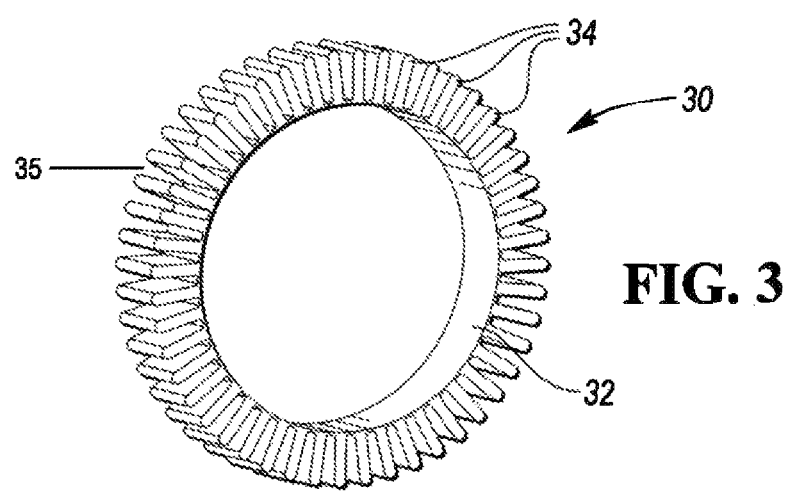
FIG. 3 is a perspective view of the annular tooth member of FIG. 1.

Referring to FIGS. 1-3, a stator for an electric machine is illustrated. The electric machine for which the stator can be part of can be an electric motor, generator, motor/generator, or the like in which rotational energy can be converted into electric energy and/or vice versa.

FIG. 1 shows a stator generally at 10 (also referred to as a stator assembly or annular stator assembly) for an electric machine. The stator 10 includes a stator yoke 20 (also referred to as a lamination ring or yoke ring), shown in isolation in FIG. 2. The stator yoke 20 is assembled about an annular tooth member 30, shown in isolation in FIG. 3.

The annular tooth member 30 includes an inner circumferential surface 32 and plurality of teeth 34 (also referred to as stator teeth) extending radially outward therefrom. Likewise, the stator yoke 20 includes a plurality of surface features 22 (e.g., indentations, pockets, grooves, etc.) that are sized and configured to receive the radial ends of the teeth 32 when assembled. The surface features 22 are defined on an inner circumferential surface 23 of the yoke 20. The surface features can be modified to fit the shape of the teeth, as will be described with reference to FIGS. 5A-5C below.

Figure 4:
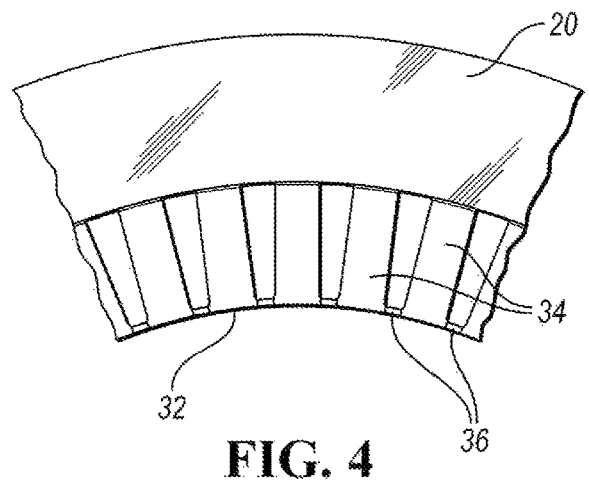
FIG. 4 is a front view of a sector of the stator of FIG. 1.

Referring to FIGS. 3-4, the annular tooth member 30 includes an inner surface 32 and plurality of teeth 34 (also referred to as stator teeth) extending radially outward therefrom. The space between the teeth 34 defines a gap 35 or space for the windings to be located. The teeth are connected via the inner circumference 32 of the annular tooth member 30, and provide large slot openings at the outer circumference of the annular tooth member. The large slot openings allow for ease in inserting and installing the winding coil. This results in a simpler winding process resulting in a more efficient winding with shorter end-turns and higher slot fill factor.

A region of material (e.g., metal) connecting the teeth near the inner surface is shown at 36. This region of material 36 connecting the teeth constitutes a high permeability path for the slot flux, which can lead to a significant increase in slot leakage flux, resulting in reductions in the output power of the electric machine. In order for the electric machine to have good performance, the slot leakage flux that travels from tooth to tooth without crossing the air gap between the stator and the rotor should be minimized.

Therefore, according to various embodiments of this disclosure, the regions 36 are treated, coated, or otherwise dealt with in order to locally reduce or suppress the magnetic permeability through these regions. Various methods of suppressing the magnetic permeability through these regions 36 are explained below. Magnetic separation or inhibition through these regions 36 can be provided while retaining the mechanical connection between the teeth 34. In various embodiments, the regions 36 are treated via one or more methods described below to locally suppress magnetic permeability. The treated regions 36 with reduced magnetic permeability decrease slot leakage fluxes by introducing a flux barrier between the teeth at the inner circumference of the stator. In this approach, the physical structure of the one-piece annular tooth member 30 remains as one piece, while its magnetic profile is modified and becomes discontinuous at the regions 36.

Various embodiments are contemplated in this disclosure for reducing the magnetic permeability in the regions 36 between the teeth. These methods provide a magnetic flux barrier between the teeth. The permeability of the regions 36 is reduced to be less than the rest of the stator regions and ideally is equal to or near the permeability of air ($4\pi \times 10^{-7}$ H·m$^{-1}$).

In one embodiment of reducing the magnetic permeability, indentations are made on the regions 36. Either a single indentation or an array of indentations can be made to plastically deform the region 36. For an array of indentations, the exact shape, position, number, and arrangements of indentations can be varied.

In another embodiment of reducing the magnetic permeability, the regions 36 can be deformed as a whole by using a forming die, for example.

In another embodiment of reducing the magnetic permeability, the regions 36 can be punched and a lateral extrusion force can be applied to laterally deform each region 36.

In another embodiment of reducing the magnetic permeability, peening can be performed on the regions 36 by methods such as shot peening, laser peening, cavitation peening and wet shot peening.

The magnetic permeability of the regions 36 can also be modified by doping and modifying the chemical composition of the regions 36. For example, in one embodiment, the magnetic permeability is reduced or suppressed by inducing phase transformation. When lamination (iron silicon alloy) temperature is raised above a certain point, it undergoes a phase transition into y-Fe and loses its ferromagnetic properties. This non-ferromagnetic austenite phase can be stabilized at room temperature by the addition of certain alloying elements, such as Manganese or Nickel or Chromium or Molybdenum or a combination of any two, or three all four elements. Locally reducing magnetic permeability can be achieved by first coating a layer of the aforementioned element(s) on the lamination surface in the selected area. And then the lamination is subjected to heat treatment in a protective environment (e.g. inert gases such as N2 and Ar or vacuum) at elevated temperature to diffuse the elements into lamination. These elements are used to stabilize the non-ferromagnetic austenitic structure after laminations are cooled down to room temperature.

In another embodiment of reducing the magnetic permeability, the magnetic permeability is suppressed by forming non-ferromagnetic or low-permeability alloys. This can be achieved by first coating a thin layer of at least one element such as Manganese, Aluminum, Silicon, Carbon, Sulfur, Germanium, Nickle, and Chromium on the lamination surface in the selected area. And then the lamination is subjected to heat treatment in a protective environment at elevated temperature to diffuse the element(s) into lamination. A new non-ferromagnetic or low permeability alloy is formed at selected areas after diffusion.

Another way of suppressing or reducing the magnetic permeability is by ion implantation. Ions such as Oxygen, Carbon, and Nitrogen can be implanted into the regions using a mask, resulting in non-ferromagnetic oxides, carbides, and nitrides. Annealing after ion implantation may be needed to restore the implantation-caused crystallographic damage and to diffuse the doping elements deeper into the lamination.

Once these regions 36 are magnetically modified, the teeth laminations can be adhered together or secured together by using dimples or adhesive to form a solid one-piece teeth core. Similarly, a stator yoke core or yoke ring can be made by adhering or dimpling multiple ring-shaped stator yoke laminations. After the winding coils are inserted from the outer circumference slot openings between the teeth, the stator yoke 20 is installed to guide the magnetic flux. Since a mechanically secure contact between the annular tooth member 30 and the stator yoke 20 is desirable, a locking and aligning mechanism may be used. Various embodiments of such a connection are shown in FIGS. 5A-5C.

Figure 5A:
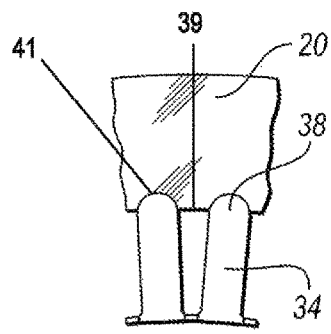
FIG. 5A is a partial front view of one embodiment of a connection between the yoke and the annular tooth member (only two teeth shown for simplicity).

For example, FIG. 5A shows teeth 34 with rounded outer ends 38, similar to the embodiment shown in FIG. 3. This locks the stator teeth 34 with the stator yoke 20 with a rounded force distribution profile about the rounded ends 38.

Figure 5B:
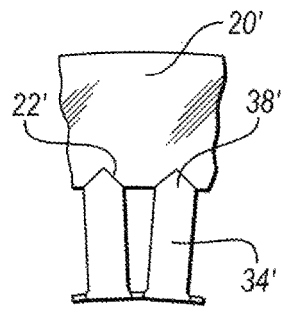
FIG. 5B is a partial front view of another embodiment of a connection between the yoke and the annular tooth member (only two teeth shown for simplicity).

FIG. 5B shows another embodiment in which the teeth 34' are provided with pointed ends 38' that each end in an apex that is generally central with each respective end 38'. The corresponding surface features 22' have an apex that matches the apex of the ends 38'. This provides a single centralized tip with tapered ends for receiving the force between the teeth and the yoke 20'.

Figure 5C:
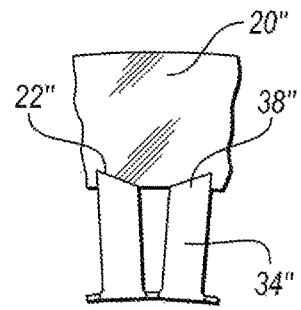
FIG. 5C is a partial front view of yet another embodiment of a connection between the yoke and the annular tooth member (only two teeth shown for simplicity).

FIG. 5C shows yet another embodiment in which the teeth 34" are provided with pointed ends 38" that end in an apex that is off-center relative to each respective center of each tooth 34". The teeth can alternate such that one tooth 34" has its apex facing away from the gap between that tooth and the adjacent tooth. In other words, the annular tooth member can have alternating teeth such that one tooth has its apex offset to the right of center, and the next tooth has its apex offset to the left of center, and so on. This provides a distribution profile with alternating apexes of contact to vary the force profile about the circumference of the annular tooth member.

Figure 6:
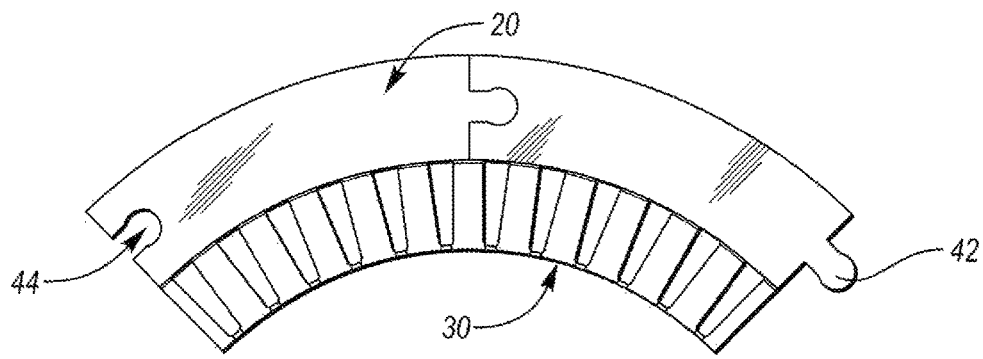
FIG. 6 is a front view of a sector of a stator according to one embodiment in which the yoke includes a plurality of segments connected to one another circumferentially about the annular tooth member.

Referring to FIG. 6, in one embodiment the stator yoke 20 is segmented and assembled together rather than being a single, unitarily-formed structure. In this embodiment, the segmented yoke structure 20 can include segments each with a male end 42 and a female end 44. This allows the stator yoke 20 to be assembled about the teeth, piece by piece, while securing a mechanical connection between the stator yoke and the teeth. While the male and female ends are illustrated to have a partial-circular profile, other designs are contemplated such as semi-circle, equilateral triangle, right angle triangle, and others. Multiple different shapes and different combinations can be used about the same stator yoke. An additional ring or housing itself may be needed on the outside of the stator yoke to bind or hold all the yoke segments together.

It should be understood that concepts disclosed with respect to one or more figures can be combined with concepts disclosed in one or more other figures. For example, the stator can be provided with the connections of the various yoke segments as shown in FIG. 6 as well as the connection between the teeth and the yoke as shown in FIGS. 5A, 5B, and/or 5C.

Furthermore, while the embodiments disclosed herein have the stator ring being assembled about the annular tooth member, it is contemplated that the ring member may be located radially inward from the annular tooth member. In this fashion, the teeth would extend radially inwardly with air gaps at the inner ends of the teeth rather than the outer ends. The windings would be assembled from the inner region of the tooth member and pressed radially outward, and the annular tooth member would be fitted about the outer periphery of the stator ring.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A stator for an electric machine, comprising:
   a stator yoke having a first inner surface; and
   a metal annular tooth member including
      a second inner surface being continuous and annular,
      a plurality of teeth extending radially outward from the second inner surface and coupled to the first inner surface, and
      regions of metal between the teeth, that are integrally formed with the teeth, having a reduced magnetic permeability relative to the teeth to provide a magnetic flux barrier between the teeth, wherein the regions of metal between the teeth include a plastically-deformed region to provide the magnetic flux barrier.

2. The stator of claim 1, wherein the regions of material between the teeth magnetically separate the teeth from each other.

3. The stator of claim 1, wherein the regions of material between the teeth provide a mechanical connection between the teeth.

4. The stator of claim 1, wherein the stator yoke includes a plurality of outer yoke sections each coupled to some of the plurality of teeth, and the outer yoke sections are coupled together to collectively form the stator yoke.

5. The stator of claim 1, wherein the stator yoke includes a plurality of outer yoke sections coupled together to collectively form the stator yoke, and the annular member includes a plurality of inner sections coupled together to collectively form the annular member.

6. The stator of claim 5, wherein the inner sections are part of a single unitary annular member.

7. A stator for an electric machine, comprising:
   a stator yoke having a first inner circumferential surface defining recesses; and
   a metal annular tooth member including
      a second inner circumferential surface being continuous and annular, and
      a plurality of teeth circumferentially spaced from each other to define winding gaps therebetween, the teeth extending radially outward from the second inner surface and received in the recesses of the first inner surface, wherein
      regions of metal of the second inner surface, spanning between the teeth and being integral with the teeth, have a reduced magnetic permeability relative to the teeth to provide a magnetic flux barrier between the teeth, wherein the regions of metal between the teeth include a plastically-deformed region to provide the magnetic flux barrier.

8. The stator of claim 7, wherein the regions of material between the teeth magnetically separate the teeth from each other.

9. The stator of claim 7, wherein the regions of material between the teeth provide a mechanical connection between the teeth.

* * * * *